US012192701B2

(12) United States Patent
Kato et al.

(10) Patent No.: US 12,192,701 B2
(45) Date of Patent: Jan. 7, 2025

(54) ULTRASONIC GENERATOR

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hiromichi Kato, Nisshin (JP); Nobuyuki Otake, Nisshin (JP); Takashi Inoue, Nisshin (JP); Takayuki Shibata, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 166 days.

(21) Appl. No.: 17/887,044

(22) Filed: Aug. 12, 2022

(65) Prior Publication Data

US 2023/0058119 A1 Feb. 23, 2023

(30) Foreign Application Priority Data

Aug. 17, 2021 (JP) ................................ 2021-132927

(51) Int. Cl.
*H04R 17/00* (2006.01)

(52) U.S. Cl.
CPC ....... *H04R 17/00* (2013.01); *H04R 2201/003* (2013.01); *H04R 2499/13* (2013.01)

(58) Field of Classification Search
CPC .............. H04R 17/00; H04R 2201/003; H04R 2499/13; H04R 3/12; H04R 19/02;
(Continued)

(56) References Cited

U.S. PATENT DOCUMENTS 6,556,687 B1 * 4/2003 Manabe .................. H04R 3/12 381/387
6,850,623 B1 * 2/2005 Norris .................... H04R 17/00 381/89

(Continued)

FOREIGN PATENT DOCUMENTS

CN 209488811 U * 10/2019 ............ H04R 19/02
JP 2007190408 A * 8/2007 ............ G10K 15/04
WO WO-2005036921 A2 * 4/2005 ............ G10K 15/02

OTHER PUBLICATIONS

Tsutomu Oohashi, "Hypersonic Effect", ISBN9784000244848, Sep. 22, 2017.

*Primary Examiner* — Angelica M McKinney
(74) *Attorney, Agent, or Firm* — Posz Law Group, PLC

(57) ABSTRACT

An ultrasonic generator has a speaker element having a first resonance frequency and a speaker element having a second resonance frequency. The first resonance frequency and the second resonance frequency are adjacent resonance frequencies in the speaker. The distance between the elements is set so that the sound from the first speaker element and the sound from the second speaker element have a predetermined relationship at a target position. The target position is two or more positions on the object located in the target space. A predetermined relationship is a relationship in which a sound from the first speaker element and a sound from the second speaker element strengthen each other at an intermediate frequency between the first resonance frequency and the second resonance frequency.

9 Claims, 11 Drawing Sheets

(58) Field of Classification Search
CPC . B06B 1/0207; B06B 2201/20; B06B 1/0622; G06F 1/1684; A61H 39/007; G10K 15/04
See application file for complete search history.

(56) References Cited

U.S. PATENT DOCUMENTS

| | | | | |
|---|---|---|---|---|
| 7,079,659 | B1 | 7/2006 | Oohashi et al. | |
| 2005/0195985 | A1* | 9/2005 | Croft, III | H04R 17/00 367/137 |
| 2008/0281238 | A1* | 11/2008 | Oohashi | A61H 39/007 601/46 |
| 2010/0074459 | A1 | 3/2010 | Chung et al. | |
| 2011/0182450 | A1 | 7/2011 | Chung et al. | |
| 2013/0293065 | A1 | 11/2013 | Hajati et al. | |
| 2014/0098978 | A1 | 4/2014 | Fukuoka et al. | |
| 2014/0269196 | A1* | 9/2014 | Baym | G06F 1/1684 367/118 |
| 2016/0263887 | A1 | 9/2016 | Tanaka | |
| 2018/0117912 | A1 | 5/2018 | Tanaka | |
| 2019/0118223 | A1 | 4/2019 | Suzuki et al. | |

* cited by examiner

FIG. 5

| | |
|---|---|
| (1) | $fmid = (f1 + f2)/2$ |
| (2) | $\lambda mid = (\lambda 1 + \lambda 2)/2$ |
| (3) | $\lambda mid = c/fmid$ |
| (4) | $n \times \lambda mid = \Delta d + \lambda mid/2$ |
| (5) | $\Delta d = dH - dL$ |
| (6) | $dH = \sqrt{(z + x)^2 + y^2}$ |
| (7) | $dL = \sqrt{(z - x)^2 + y^2}$ |
| (8) | $c = 340\ (m/sec)$ |
| (9) | $n = \frac{\sqrt{(z + x)^2 + y^2} - \sqrt{(z - x)^2 + y^2}}{\lambda mid} + \frac{1}{2}$ |
| (10) | $2z/\lambda mid = C(y)$ |
| (11) | $2z = C(y) \times \lambda mid$ |

| n | |
|---|---|
| 1 |   |
| 2 |   |

| x (mm) | y (mm) | fmid=(f1+f2)/2 (kHz) λmid (mm) | | C(y) =2z/λmid |
|---|---|---|---|---|
| | | 45 (kHz) 7.55 (mm) | 135 (kHz) 2.52 (mm) | |
| | | 2z (mm) | 2z (mm) | |
| 73 | 100 | 6.40 | 2.14 | 0.85 |
| | 500 | 26.16 | 8.72 | 3.46 |
| | 1000 | 51.90 | 17.30 | 6.87 |
| | 2000 | 103.60 | 34.52 | 13.71 |

ULTRASONIC GENERATOR

CROSS REFERENCE TO RELATED APPLICATIONS

The present application claims the benefit of priority from Japanese Patent Application No. 2021-132927 filed in Japan filed on Aug. 17, 2021, the entire disclosure of the above application is incorporated herein by reference.

TECHNICAL FIELD

The disclosure herein relates to an ultrasonic generator.

BACKGROUND

An ultrasonic generator radiates an ultrasonic sound wave toward a target space. The ultrasonic sound wave acts on a surface of an object located in the target space. The ultrasonic sound wave may also act on an inner content in the object. This type of ultrasonic generator is required to have wideband characteristics to generate a wide band sound waves.

SUMMARY

The ultrasonic generator is generally required to generate a wide band ultrasonic. Further, the ultrasonic generator is required to provide a sound wave having a strong sound pressure to a target space for which a sound wave is provided. Further improvements are required in the ultrasonic generator in the above-mentioned viewpoint or in other viewpoints not mentioned.

The disclosure provides an ultrasonic generator which radiates sound waves toward a target space, comprising: a plurality of speaker elements which are piezoelectric MEMS ultrasonic transducers, wherein the plurality of the speaker elements includes: a first speaker element having a first resonance frequency; and a second speaker element having a second resonance frequency adjacent to the first resonance frequency, wherein the first speaker element and the second speaker element are arranged apart from each other in a direction intersecting with a direction toward the target space, and wherein the distance between the first speaker element and the second speaker element is set so that a strengthening relationship of sounds having an intermediate frequency from the first speaker element and from the second speaker element appear at two or more positions on an object located in the target space, and wherein the strengthening relationship is created by strengthening a sound having the intermediate frequency between the first resonance frequency and the second resonance frequency from the first speaker element and a sound having the intermediate frequency from the second speaker element.

According to the ultrasonic generator disclosed herein, it is possible to obtain a strengthening relationship of sounds at an intermediate frequency at two or more positions on an object. As a result, an ultrasonic generator which supplies a strong sound pressure in a wide band is provided. Further, even if the position of the object is shifted, a strong sound pressure can still be supplied to the object.

The disclosed aspects in this specification adopt different technical solutions from each other in order to achieve their respective objectives. Reference numerals in parentheses described in claims and this section exemplarily shows corresponding relationships with parts of embodiments to be described later and are not intended to limit technical scopes.

The objectives, features, and effects disclosed herein is further clarified by reference to the subsequent detailed description and accompanying drawings.

BRIEF DESCRIPTION OF DRAWINGS

FIG. 5 is a table showing formulas.

DETAILED DESCRIPTION

Figure 1:
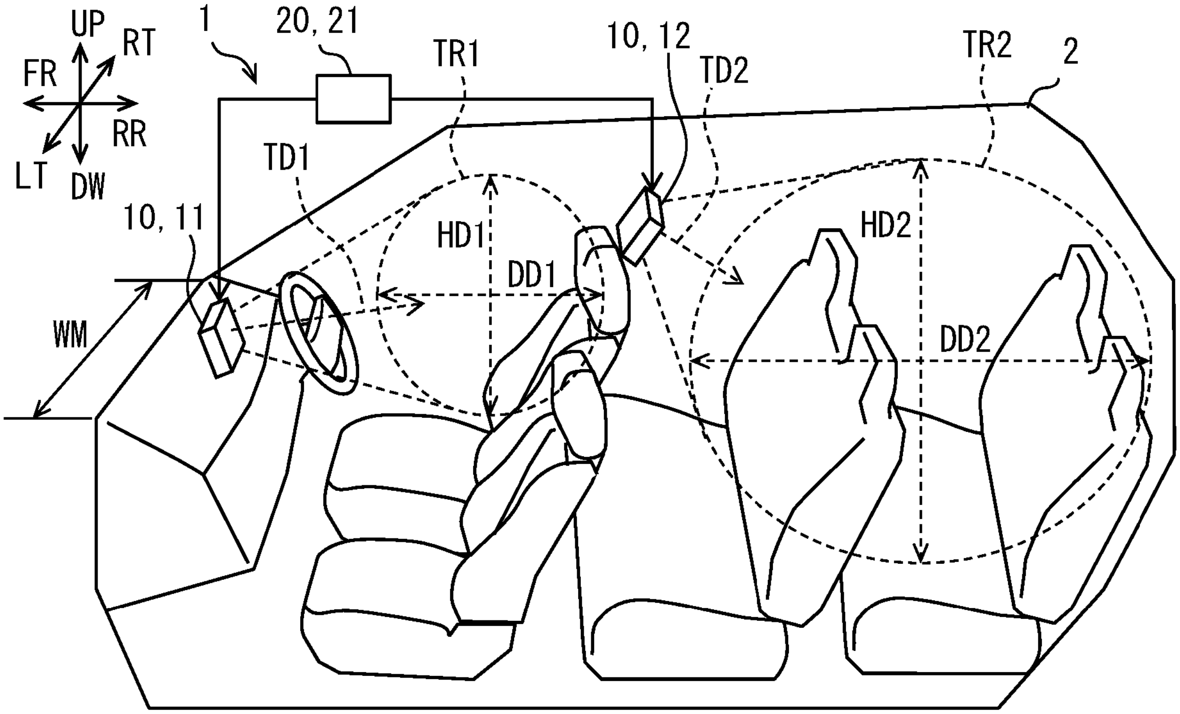
FIG. 1 is a block diagram of an ultrasonic system according to a first embodiment.

A plurality of embodiments is described with reference to the drawings. In some embodiments, functionally and/or structurally corresponding and/or associated elements may be given the same reference numerals, or reference numerals with different digit placed on equal to or higher than a hundred place. For corresponding parts and/or associated parts, reference can be made to the description of other embodiments.

JP2019-76122A discloses an invention of an ultrasonic transducer and an ultrasonic diagnostic apparatus. This type of ultrasonic generator is required to have wideband characteristics to generate a wide band sound waves. In the case that the apparatus has a plurality of piezoelectric cells having different resonance frequencies, the apparatus of JP2019-76122A performs phase-matchings among the piezoelectric cells to obtain wideband characteristics. The disclosure of the prior art literature is incorporated herein by reference to explain technical elements presented herein.

The ultrasonic generator is generally required to generate a wide band ultrasonic. Further, the ultrasonic generator is required to provide a sound wave having a strong sound pressure to a target space for which a sound wave is provided. Further improvements are required in the ultrasonic generator in the above-mentioned viewpoint or in other viewpoints not mentioned.

It is an object disclosed to provide an ultrasonic generator which supplies strong sound pressure over a wide band.

First Embodiment

In FIG. 1, the ultrasonic system 1 is an apparatus which supplies sound to target spaces TR1 and TR2. An object exists in the target spaces TR1 and TR2. In this embodiment, the target spaces TR1 and TR2 can also be referred to as an indoor space. Specifically, the target spaces TR1 and TR2 are an inside of a vehicle 2. The target space TR1 is a space having a height of HD1 and a depth of DD1. The target space TR2 is a space having a height of HD2 and a depth of DD2. The target space TR2 is larger than the target space TR1. The target spaces TR1 and TR2 are examples for explaining the embodiment. The ultrasonic system 1 may include a single target space. The ultrasonic system 1 may include a plurality of target spaces of three or more.

In this specification, the term vehicle 2 should be construed in a broad sense. The vehicle 2 includes cars, aircraft, ships, space crafts, and the like. Further, the vehicle 2 includes a device which does not involve movement, such as a simulation device and an amusement device for boarding a human. The vehicle 2 and the target spaces TR1 and TR2 may be defined three-dimensionally. In the following description, names such as a forward direction FR, a backward direction RR, a right direction RT, a left direction LT, an upward direction UP, and a downward direction DW may be used. The target spaces TR1 and TR2 may be defined by a maximum width WM in a width direction WD, a maximum height HM in a height direction HD, and a maximum depth DM in a depth direction DD. These names are for convenience of understanding and do not limit this disclosure.

The ultrasonic system 1 supplies a predetermined sound to the object. In other words, the ultrasonic system 1 reproduces a predetermined sound on a surface and/or inside the object. The ultrasonic system 1 is a device which changes properties of the object by sound. An example of the object is a living thing. The ultrasonic system 1 is a device which creates a predetermined biological reaction by supplying a predetermined sound to an organism. In other words, the ultrasonic system 1 is a device which exerts a predetermined effect on an organism by reproducing a predetermined sound on the surface and/or inside of the organism. The object in the target spaces TR1 and TR2 may be a human. In this case, the ultrasonic system 1 is a device which supplies sound to humans.

In recent years, there have been attempts to use devices that use sounds rich in ultra-high-frequency components that exceed the upper limits of audible frequency. One of the devices supplies audible sound to the human ear and applies ultrasonic waves to the human body. In this attempt, it is tried to increase alpha waves in brain waves, for example. For example, it is attempted to obtain effect such as increased sensitivity, reduced stress, optimized activity of the autonomic nervous system, optimized activity of the endocrine system, and/or optimized activity of the immune system. This type of effect is also known as the hypersonic effect. In order to develop the hypersonic effect in humans, it is required to radiate the human body surface with hypersonic sound containing ultra-high frequency components.

An ultrasonic generator 10 which can be used for this purpose may be referred to as a name such as an ultrasonic speaker or an ultrasonic transducer. The ultrasonic generator 10 radiates sound waves toward target spaces TR1 and TR2. In the following description, the ultrasonic generator 10 is referred to as a speaker 10. The ultrahigh frequency component includes at least a part of a wide band extending from a lower limit frequency of 40 kHz to an upper limit frequency of more than 100 kHz. In one example, the ultrahigh frequency component may extend over a wide band from the lower limit frequency of 40 kHz to the upper limit frequency of 140 kHz. The speaker 10 is required to reproduce hypersonic sound on the surface of the human body with a small difference of the sound pressure.

The ultrasonic system 1 includes a speaker 10 that generates sound in a wide frequency band. The ultrasonic system 1 includes an electric circuit 21 as a sound source 20 that supplies a sound source signal to the speaker 10. The ultrasonic system 1 has a circuit configuration adapted for an application environment such as a shape of the target spaces TR1 and TR2. The adapted circuit configuration includes a configuration of the electrical circuit 21 and the number of speakers 10. The ultrasonic system 1 of this embodiment has a circuit configuration assuming a user of the vehicle 2 as the object. The electric circuit 21 includes a hypersonic sound generator circuit, a plurality of phase adjustment circuits, a plurality of amplifier circuits, and a plurality of piezoelectric element drive circuits. For the configuration of these circuit elements, the description of JP2019-76122A is incorporated by reference.

The speaker 10 radiates the ultrasonic toward the target space, and reproduces the hypersonic sound in the target space at a predetermined sound pressure. The speaker 10 is characterized by a plurality of indicators indicating performance such as directivity and output. A plurality of indicators includes an effective distance at which a required sound pressure can be reproduced. In this embodiment, the ultrasonic system 1 includes a plurality of speakers 11 and 12 in order to provide a predetermined sound to a wide range in a room.

The ultrasonic system 1 includes a first speaker 11. The first speaker 11 is designed for the target space TR1 which is a space where a user of a driver's seat is assumed to exist. The first speaker 11 radiates a sound wave to the main sound wave direction TD1. The sound wave direction TD1 points a space where a head to a chest of the driver are supposed to be present. The first speaker 11 may be intended for a person sitting in a front seat. In this case, the first speaker 11 may cover a front seat range including the driver's seat and a passenger seat as the target space.

The ultrasonic system 1 includes a second speaker 12. The second speaker 12 is designed for the target space TR2 which is a space where a user of a rear seat is assumed to exist. The second speaker 12 has a main sound wave direction TD2. The sound wave direction TD2 points a space where a head to a chest of a rear seat user are supposed to be present.

The ultrasonic system 1 may provide different sounds to the user of the target space TR1 and the user of the target space TR2, for example. For example, since the user in the driver's seat who is involved in a driving operation of the vehicle 2 is required to have a high degree of arousal, the ultrasonic system 1 is expected to have an effect of increasing the degree of arousal. For example, a user of the rear seat who are not directly involved in driving operations seek comfort. In this case, the ultrasonic system 1 is expected to have the effect of giving comfort to the user in the rear seat. The ultrasonic system 1 may provide the same sound to the user of the target space TR1 and the user of the target space TR2.

The first speaker 11 and the second speaker 12 have the same configuration. In the following description, the speaker 10 may be described without distinguishing between the first speaker 11 and the second speaker 12.

Figure 2:
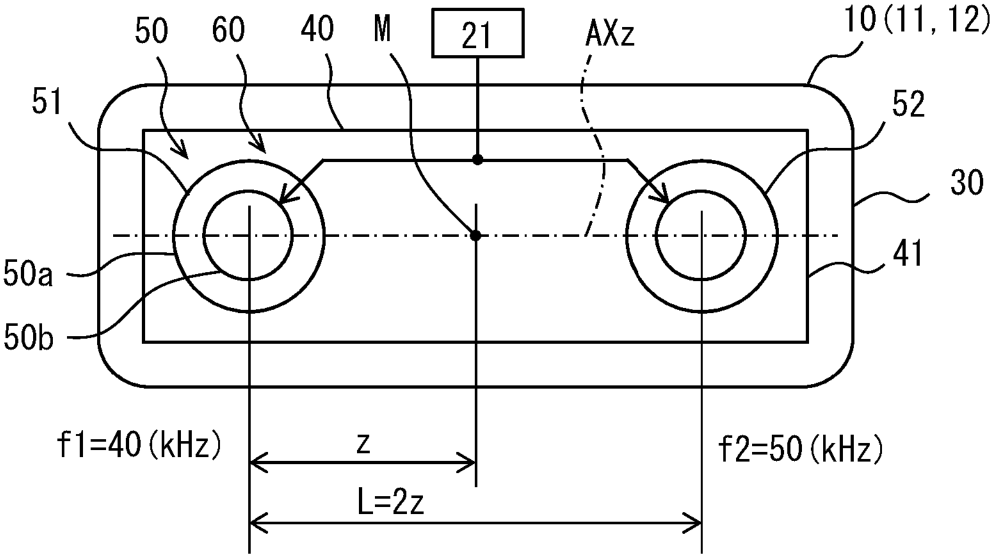
FIG. 2 is a front view of an ultrasonic generator.

In FIG. 2, the speaker 10 includes at least one container 30 and at least one semiconductor element 40. The speaker 10 may include a single container 30 or a plurality of containers 30. The single container 30 may accommodate a single semiconductor element 40 or a plurality of semiconductor elements 40. Each of the plurality of containers 30 accommodates the semiconductor element 40 described later, and may provide one speaker 10 as a group. The speaker 10 may include a single semiconductor element 40 or a plurality of semiconductor elements 40. The single semiconductor element 40 may include a plurality of speaker elements having adjacent resonance frequencies f1 and f2, which are described later. Each of the plurality of semiconductor elements 40 may include a plurality of speaker elements having adjacent resonance frequencies f1 and f2, which are described later. In the plurality of semiconductor elements 40, one semiconductor element 40 may include a speaker element having a resonance frequency f1, and another semiconductor element 40 may include a speaker element having a resonance frequency f2. In this embodiment, the speaker 10 includes a single container 30 and a single semiconductor element 40.

The semiconductor element 40 is housed in the container. The semiconductor element 40 is also referred to as a MEMS element (MEMS: Micro Electro Mechanical Systems). The semiconductor element 40 is formed by using a technique related to MEMS.

The semiconductor element 40 has a semiconductor substrate 41. The semiconductor substrate 41 is a single semiconductor substrate made of a continuous material. The semiconductor substrate 41 is made of, for example, Si. The semiconductor substrate 41 has a plurality of speaker elements 50. The speaker element 50 includes a plurality of speaker elements 51 and 52. In other words, both the first speaker element 51 and the second speaker element 52 are formed on the common semiconductor substrate 41. In the drawing, two speaker elements 51 and 52 are shown as typical examples. One speaker element 50 includes a resonance plate region 50*a* and a piezoelectric element 50*b*. The resonance plate region 50*a* is characterized by various properties for resonating at a predetermined resonance frequency. Various properties include material-dependent properties, mechanical shape-dependent properties such as area, thickness, and the like. The piezoelectric element 50*b* is electrically connected to the electric circuit 21. The piezoelectric element 50*b* vibrates at a predetermined frequency in response to a signal supplied from the electric circuit 21. The resonance plate region 50*a* resonates with the piezoelectric element 50*b* and emits a sound wave having a predetermined frequency. The speaker element 50 is also referred to as a PMUT (Piezoelectric Micro-machined Ultrasonic Transducer). The speaker element 50 is also called a piezoelectric MEMS ultrasonic transducer.

The first speaker element 51 and the second speaker element 52 are associated with each other by having two adjacent resonance frequencies in the ultrasonic system 1. As an example, the first speaker element 51 has a resonance frequency of the first frequency f1=40 kHz. The second speaker element 52 has a resonance frequency of the second frequency f2=50 kHz. A difference f2−f1 between two adjacent resonance frequencies is set within a range of several kHz to 50 kHz. In this embodiment, the difference f2−f1 between two adjacent resonance frequencies is 10 kHz. In another embodiment, the first speaker element 51 has a resonance frequency of the first frequency f1=130 kHz, and the second speaker element 52 has a resonance frequency of the second frequency f2=140 kHz. In this embodiment, the first frequency f1 is smaller than the second frequency f2 (f1<f2). The first speaker element 51 and the second speaker element 52 form a speaker pair 60.

The first speaker element 51 and the second speaker element 52 are arranged apart from each other in a direction (a central axis AXz described later) intersecting the direction (a central axis AXy described later) toward the target spaces TR1 and TR2. The first speaker element 51 and the second speaker element 52 are separated by a distance L in a direction of the central axis AXz which passes through the two speaker elements 50. In this embodiment, the central axis AXz is perpendicular to a direction of gravity. The central axis AXz is also a horizontal line.

A midpoint M is assumed at a midpoint between two speaker elements 51 and 52. In this case, the distance between the midpoint M and one speaker element 50 is L/2=z. In the following description, the theoretical value of the distance L may be indicated by a value 2z. The value 2z is also the minimum value of the distance L between the elements. The value 2z is the minimum distance between two speaker elements 51 and 52 having two adjacent resonance frequencies in the ultrasonic system 1.

The first speaker element 51 and the second speaker element 52 are arranged at an end portion and an end portion of the semiconductor substrate 41. This arrangement makes it possible to make the distance L as large as possible by making maximum use of a size of the semiconductor substrate 41. In other words, it is possible to provide the desired distance L by a small semiconductor substrate 41. Therefore, in many cases, the maximum value of the distance L depends on a size of the semiconductor substrate 41.

Figure 3:
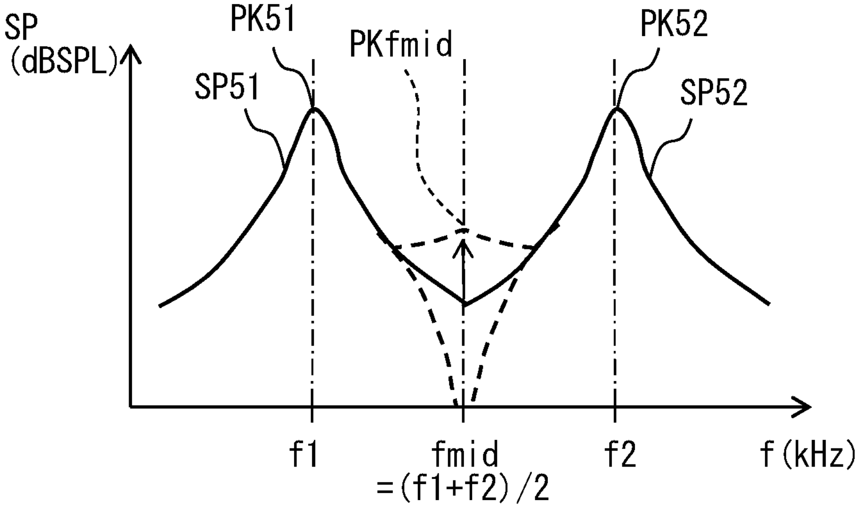
FIG. 3 is a graph showing frequency characteristics of an ultrasonic generator.

FIG. 3 is a graph in which the horizontal axis is the frequency fkHz and the vertical axis is the sound pressure SP (dBSPL). FIG. 3 shows a sound pressure curve on the frequency axis. The sound pressure curve SP51 of the sound generated by the first speaker element 51 has a peak at the first frequency f1. The sound pressure curve SP52 of the sound generated by the second speaker element 52 has a peak at the second frequency f2. It is possible to assume that an intermediate frequency fmid (fmid=(f1+f2)/2) between the first frequency f1 and the second frequency f2. The sound pressure of the intermediate frequency fmid depends on a phase difference between a phase of the sound from the first speaker element 51 and a phase of the sound from the second speaker element 52. For example, in the case that the sounds cancel each other, a dip is generated, and in the case that the sounds strengthen, a peak is generated.

In the case that the first speaker element 51 and the second speaker element 52 are arranged close to each other, this arrangement may be regarded as a point sound source. In this case, if there is a phase difference of ½ of the wavelength A at the intermediate frequency fmid, a dip occurs at the intermediate frequency fmid. Moreover, in the case that two speaker elements are regarded as a point sound source, the sound of the intermediate frequency fmid becomes dips at all the positions in the target space. In this case, peaks and dips are observed alternately along the frequency axis at all positions in the target space. As a result, it is difficult to obtain a uniform sound pressure without dips in a wide frequency band.

In this embodiment, the distance L is set and designed so that the sound of the intermediate frequency fmid does not at least cause a dip at a plurality of positions in the target space. The distance L is set to create a position where the sounds of the intermediate frequency fmid strengthen each other at two or more positions on the object. In this embodiment, it is assumed that the central axis AXy passes through the midpoint M and the central point of the object. Therefore, in the case that assuming a one-sided region from the center point of the object, the distance L is set so as to generate a position where the sounds of the intermediate frequency fmid strengthen each other at one or more positions on the object. The position where the sounds of the intermediate frequency fmid strengthen each other is created due to a difference in distances from the two speaker elements. In this embodiment, the distance L is set and designed so that the sounds strengthen each other at the intermediate frequency fmid. The distance L may be set equal to or more than a theoretically required minimum value 2z.

As shown in FIG. 3, at the intermediate frequency fmid, a peak PKfmid lower than the peak PK51 of the sound pressure curve SP51 or the peak PK52 of the sound pressure curve SP52 may be observed. The sound pressure (broken line) of this peak PKfmid is stronger than the sound pressure (solid line) obtained by the sound pressure curve SP51 or the sound pressure curve SP52. As a result, it is possible to obtain a uniform sound pressure characteristic in which a remarkable dip does not appear in the sound pressure over a wide band. In this embodiment, uniform sound pressure characteristic without significant dips is obtained over a wide band including the vicinity of the frequency f1, the vicinity of the frequency f2, and between the frequency f1 and the frequency f2. No significant peak occurs in the vicinity of the intermediate frequency fmid. In the vicinity of the intermediate frequency fmid, a substantially uniform sound pressure can be obtained. In other words, in the vicinity of the intermediate frequency fmid, a sound pressure characteristic that gradually increases or decreases can be obtained. A uniform sound pressure is obtained in a relatively wide band near the intermediate frequency fmid.

According to this embodiment, it is possible to avoid a situation that the sound of the intermediate frequency fmid is suppressed at all the positions of the target space. In this embodiment, the sound of the intermediate frequency fmid is reproduced with a high sound pressure at a plurality of positions in the target space. As a result, a uniform sound pressure distribution without a remarkable dip of sound pressure can be realized. From one viewpoint, the distance L between two speaker elements having adjacent resonance frequencies is set so that a plurality of peaks of the intermediate frequency fmid are observed in the target space. A wavelength of the intermediate frequency fmid is also called an intermediate wavelength Amid. From one viewpoint, the distance L is set equal to or more than the intermediate wavelength Amid. From another viewpoint, the distance L is set sufficiently larger than the intermediate wavelength Amid. The two speaker elements defining the distance L are arranged sufficiently apart from each other with respect to the intermediate wavelength Amid.

Figure 4:
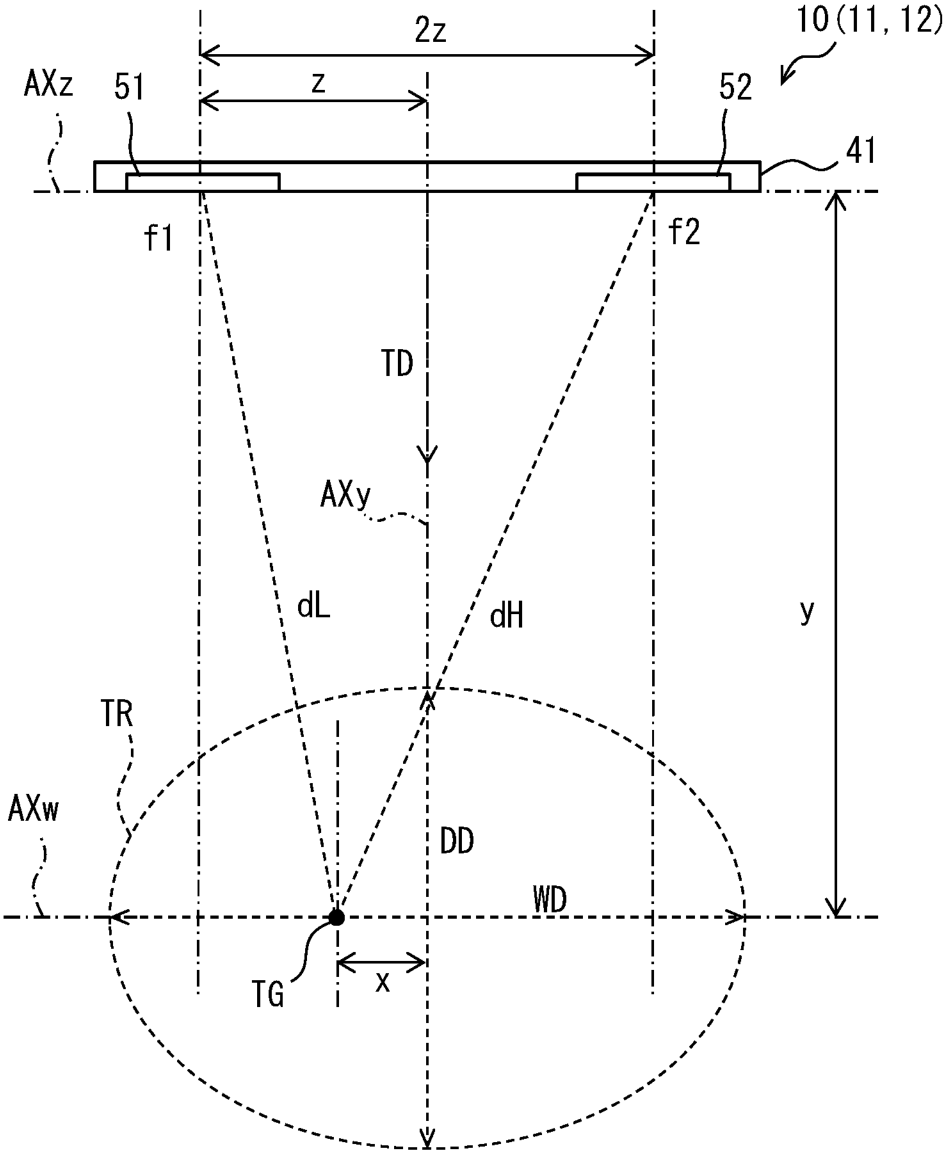
FIG. 4 is a plan view showing an ultrasonic generator and a target space.

FIG. 4 shows a positional relationship between two speaker elements 51 and 52 and the target space TR. The sound wave direction TD of the speaker elements 51 and 52 points to the target space TR. Assume a situation where a sound is supplied to the target position TG from the speaker elements 51 and 52. The speaker elements 51 and 52 and the target position TG are separated by a distance y in the central axis AXy in the sound wave direction TD. The central axis AXy passes through the midpoint between the first speaker element 51 and the second speaker element 52. Assume a situation where the first speaker element 51 and the central axis AXy or the second speaker element 52 and the central axis AXy are separated by a distance z in the central axis AXz. Therefore, the first speaker element 51 and the second speaker element 52 are separated by the value 2z in the central axis AXz. The target position TG and the central axis AXy are separated by a distance x on the axis AXw. The axis AXw is an axis parallel to the central axis AXz. The axis AXw extends in the width direction WD of the target space TR. The first speaker element 51 and the target position TG are separated by a distance dL. The second speaker element 52 and the target position TG are separated by a distance dH.

In this positional relationship, the value 2z may be set by evaluating a sound interference at the target position TG. In other words, the value 2z is set so that the sounds of the intermediate frequency strengthen each other at two or more positions on the object. The value 2z is the minimum value for satisfying the above conditions.

FIG. 5 shows a plurality of mathematical equations derived from the positional relationship of FIG. 4. A resonance frequency (center frequency) of the first speaker element 51 is the frequency f1. A resonance frequency (center frequency) of the second speaker element 52 is the frequency f2. An intermediate frequency fmid is given by an equation (1) (fmid=(f1+f2)/2). The intermediate wavelength Amid is given by an equation (2) (λmid=(λ1+λ2)/2). The relationship between the intermediate frequency fmid and the intermediate wavelength λmid is expressed by an equation (3). Note that c is the velocity of the sound wave.

The strengthening relationship between the sound from the first speaker element 51 and the sound from the second speaker element 52 on the target position TG is obtained by an equation (4) (nλmid=Δd+λmid/2), based on the wavelength A and the distance difference Δd. n is an order. A distance difference Δd is given by an equation (5) (Δd=dH−dL). The distance dH is given by an equation (6) (dH=SQRT($(z+x)^2+y^2$)). The distance dL is given by an equation (7) (dL=SQRT($(z-x)^2+y^2$)). SQRT(X) indicates the square root of X. For the sound wave velocity c, the numerical value of the equation (8) may be used.

From the above equation (4), the equation (9) indicating the order n (n=(SQRT($(z+x)^2+y^2$)−SQRT($(z-x)^2+y^2$))/λmid+½) can be obtained. The order n is a natural number. The order n may be set equal to or more than 1. The order n affects the number of positions that appear within a predetermined distance range from the central axis AXy among a plurality of positions where the strengthening relationship of two sounds strengthen each other can be obtained. In this embodiment, the distance L is set equal to or more than the value 2z which may be obtained by the equation (9) (n=(SQRT($(z+x)^2+y^2$)−SQRT($(z-x)^2+y^2$))/λmid+½). Here, n is the natural number of 1 or more, z is a distance between the midpoint of the two speaker elements and the speaker element, x is a width of the object, and y is a distance between the midpoint and the object.

From the above equation (9), an equation (10) (2z/λmid=C(y)) can be obtained. The coefficient C(y) indicates a coefficient when a distance y is fixed. The coefficient C(y) depends on the intermediate wavelength λmid. The coefficient C(y) indicates the relationship between the value 2z and the intermediate wavelength λmid. An equation (11) (2z=C(y)×λmid) is obtained by modifying the equation (10). When the distance y is determined, the value 2z is given as a value obtained by multiplying the intermediate wavelength λmid by the coefficient C(y). The equation (11) gives the minimum value 2z of the distance L. In this embodiment, the distance L is set assuming that the object is a human face.

The distance L is set equal to or more than the value 2z obtained from the equation (11) (2z=0.85×λmid).

The distance y varies depending on the application of the ultrasonic system 1. However, in applications that emit sound, it is considered that the distance y between the speaker element 50 and the target position TG is 100 mm or more. Further, the maximum value of the distance y is limited due to the upper limit of the output of the speaker 10. The maximum value of the distance y may be set to about 2000 mm. The maximum value of the distance y is proportional to the maximum value of the output of the speaker 10. The maximum value of the distance y may be assumed to be about 2000 mm to 8000 mm. Assuming the ultrasonic system 1 for a vehicle in this embodiment, the maximum value of the distance y at which the speaker 10 can effectively reproduce sound can be considered to be about 5000 mm.

Figure 6:
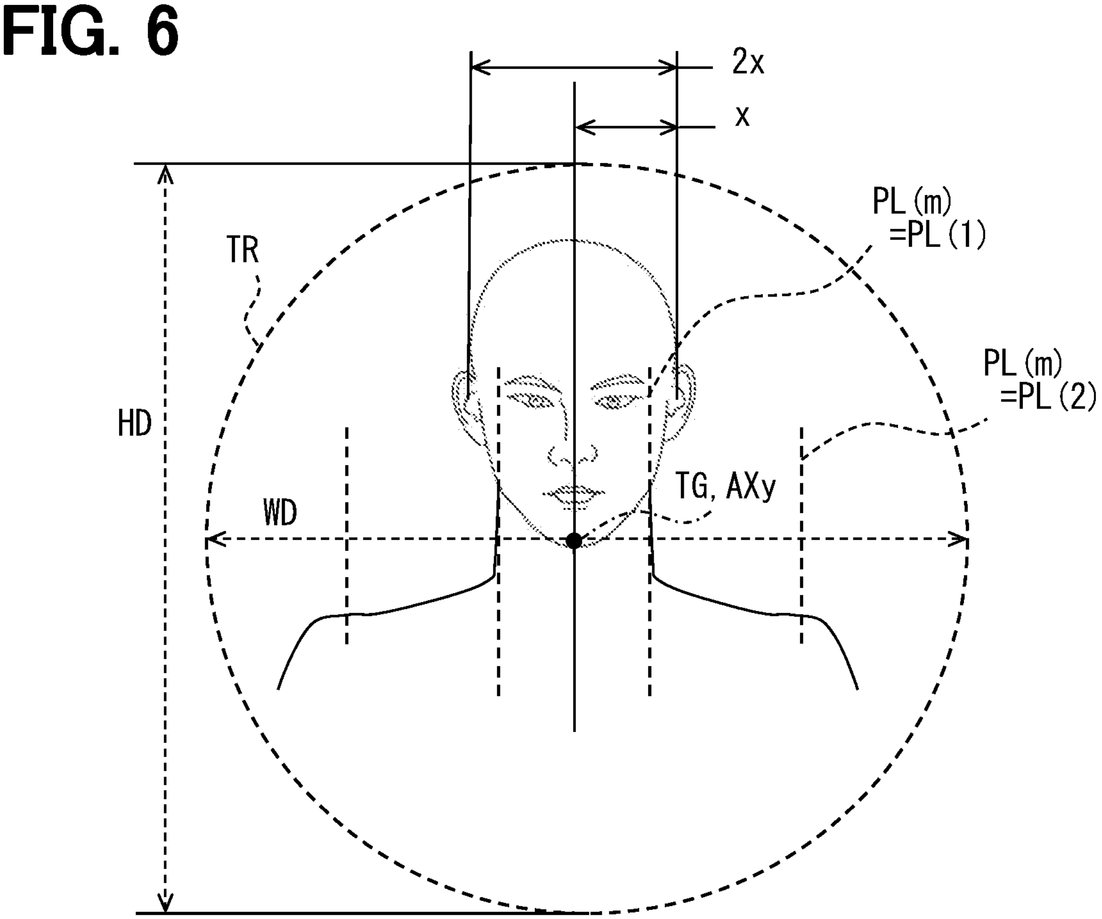
FIG. 6 is a front view showing an example of a target space.

FIG. 6 shows a setting condition of the position where the strengthening relationships in which the two sounds strengthen each other can be obtained in this embodiment. The illustration shows the case of the speaker 11. This case assumed that a human being as an object exists in the target space TR. The speaker 10 reproduces a hypersonic sound on the surface of a living body of an object. The exposed biological surface of a human may be selected as a part where the sound is felt. In this case, the human face, the human neck, and the periphery of the human chest may be selected as the parts where the sound is felt. In this case, a center of the target position TG is set around the human jaw.

FIG. 6 shows a relationship line PL(m) where the strengthening relationships in which the two sounds strengthen each other can be obtained with respect to the intermediate wavelength λmid. The first strengthening relationship from the central axis AXy is obtained along the relationship line PL(1) that intersects the central axis AXz. The second strengthening relationship from the central axis AXy is obtained along the relationship line PL(2) intersecting the central axis AXz. The relationship lines PL(1) and PL(2) are part of the curve. The strengthening relationships appear at two or more positions on the object located in the target space. The sound from the first speaker element 51 having the intermediate frequency fmid and the sound from the second speaker element 52 having the intermediate frequency fmid strengthen each other at the strengthening relationships. The distance L between the first speaker element 51 and the second speaker element 52 is set so that the above-mentioned strengthening relationship appears at two or more positions on the object.

Since the position of the object is not fixed, the position of the object varies depending on the posture of the human. In the case of assuming a face, the face can be considered to have a width of a distance 2x in the width direction WD. The distance 2x is set based on the distance x from the central axis AXy in the width direction WD. For example, in the case of a Japanese adult, the distance x can be set to about 73 mm. Any statistical numerical value can be used as the numerical value of the distance x. For example, 73 mm is given as a statistical value for Japanese people aged 18 to 30 years old.

A plurality of relationship lines PL(m) are generated on the surface of the object. This makes it possible to make a substantially uniform sound act on the surface of the object. In other words, a plurality of relationship lines PL(m) are expressed on the surface of the object. As a result, a sound having a sound pressure without a dip can be applied to the surface of the object. In this embodiment, a hypersonic sound having a sound pressure without a dip can be applied on a human face.

Further, in this embodiment, a plurality of strengthening relationships PL(m) are expressed on a surface of the object. In the illustrated example, at least two strengthening relationships PL(m) are expressed on the surface of the object. Thereby, even if the object moves, at least one strengthening relationship PL(m) can be expressed on the surface of the object. Specifically, at least one strengthening relationship PL(m) is expressed on a half side of the face. At least one strengthening relationship PL(1) is expressed in the right half region of the face. At least one strengthening relationship PL(1) is also expressed in the left half region of the face. As a result, even if the object moves within the width (distance 2x), the sound pressure obtained by the strengthening relationship PL(1) can be applied to the object.

Figure 7:
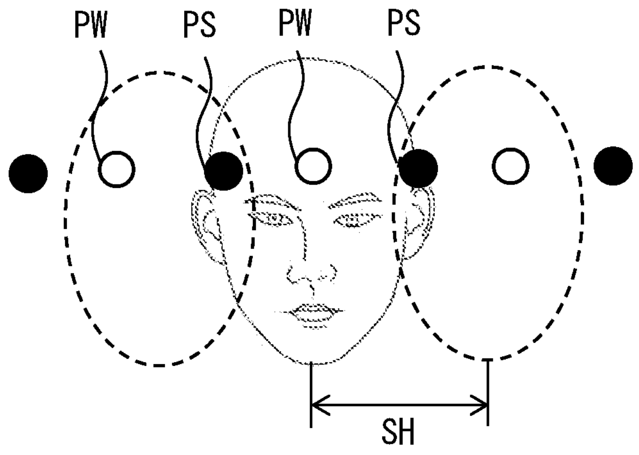
FIG. 7 is a front view showing a relationship between an object and positions where sound pressures strengthen each other.
Figure 7:
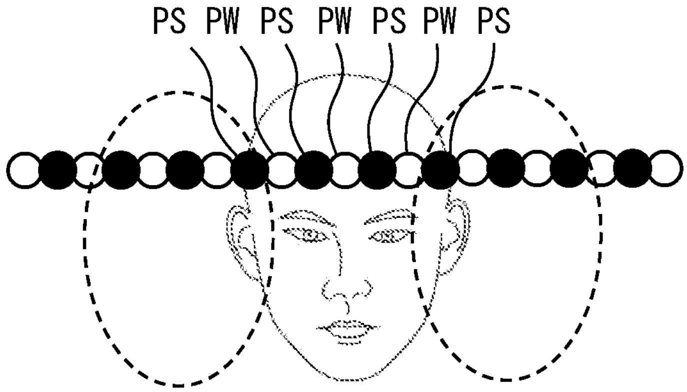

FIG. 7 shows a plurality of strengthening points PS and a plurality of weakening points PW. A human face is exemplified as an object. The solid line shows the specified position of the object (human face). The defined position indicates, for example, a position in a normal sitting posture. The broken line indicates the maximum shift position of the assumed object (human face). In this example, the maximum shift amount SH is one object (human face) (SH=2x). In this embodiment, the value 2z is set so that at least two strengthening points PS appear on the surface of the object. As a result, even if the position of the object fluctuates, the hypersonic sound can be strongly applied.

The upper part shows an example in which at least two strengthening points PS are expressed on the surface of the object. The upper part shows an example in which the order n=1. At least one strengthening point PS is expressed on one half side of the human face. Also in this example, the strengthening relationship PS appear in two positions on the object located in the target space. The sound from the first speaker element 51 having the intermediate frequency fmid and the sound from the second speaker element 52 having the intermediate frequency fmid strengthen each other in the strengthening relationship PS. In this example, even if the human face is shifted laterally (left-right direction), one strengthening point PS still appears on the face. Moreover, at all positions where the human face shifts from the specified position to the maximum shifted position, one strengthening point PS continues to appear on the face.

The lower part shows an example in which at least four strengthening points PS are expressed on the surface of the object. The lower part shows an example in which the order n=2. At least two strengthening point PS are expressed on one half side of the human face. Also in this example, the strengthening relationship PS appear in four positions on the object located in the target space. The sound from the first speaker element 51 having the intermediate frequency fmid and the sound from the second speaker element 52 having the intermediate frequency fmid strengthen each other in the strengthening relationship PS. In this example, even if the human face shifts, one strengthening point PS still appears on the face. Moreover, at all positions where the human face shifts from the specified position to the maximum shifted position, one or more strengthening point PS appear on the face.

Figures 8, 9:
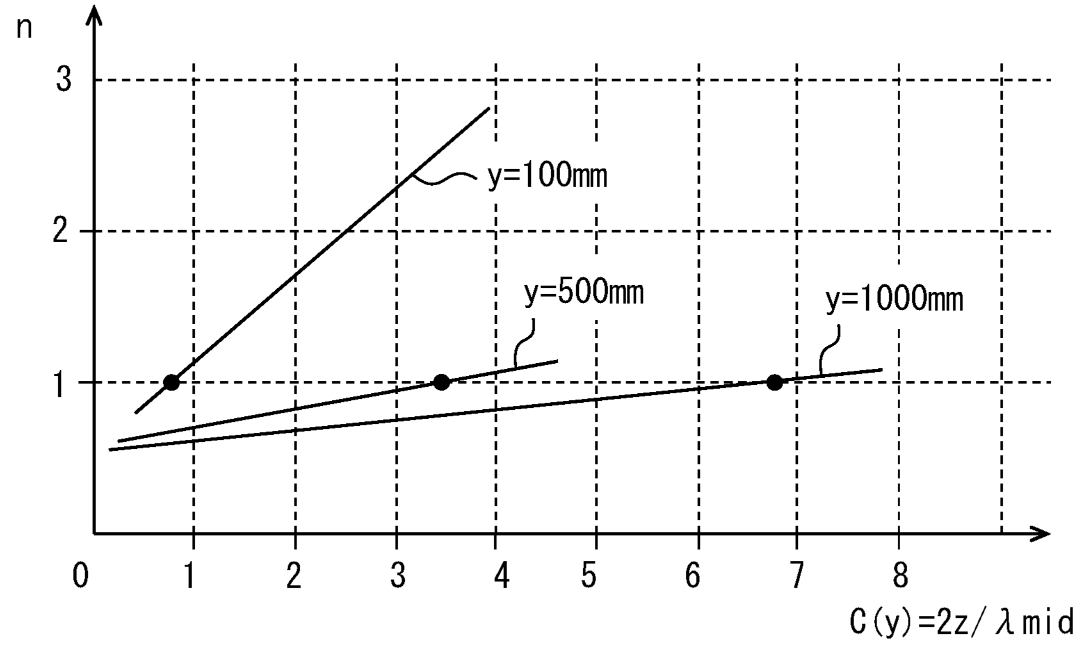
FIG. 8 is a table showing an example of a value 2z which is a distance between elements.
FIG. 9 is a graph showing a relationship between a distance to the target space and a distance between elements.

FIG. 8 shows a numerical value of the value 2z embodied using the structure of this embodiment. This example is an example in which the order n=1. This example assumes a human face as the object. Therefore, the distance x is 73 mm. An effective range of the distance y is assumed that the minimum distance y is equal to or more than 100 mm, and the maximum distance y is equal to or less than 2000 mm. The value 2z indicates a case where the intermediate frequency fmid is fmid=45 kHz and a case where the intermediate frequency fmid is fmid=135 kHz. When the intermediate frequency fmid=45, the first speaker element 51 has the resonance frequency f1=40 kHz, and the second speaker element 52 has the resonance frequency f2=50 kHz. When the intermediate frequency fmid=135, the first speaker element 51 has the resonance frequency f1=130 kHz, and the second speaker element 52 has the resonance frequency f2=140 kHz.

FIG. 9 is a graph showing the relationship between the coefficient C(y) and the order n. At the intermediate wavelength λmid, the minimum value 2z is given by the equation (11). For example, the value 2z of the distance between the first speaker element 51 and the second speaker element 52 having the intermediate frequency fmid of 45 kHz is 2z=C(y)×λmid=0.85×7.55=6.4175 mm. In the speaker 10, the distance L is set equal to or more than the minimum value 2z. The value 2z of the distance between the first speaker element 51 and the second speaker element 52 having the intermediate frequency fmid of 135 kHz is 2z=C(y)×λmid=0.85×2.52=2.142 mm. In the drawing, rounded values are illustrated.

As shown in FIGS. 8 and 9, the coefficient C(y) is a constant value regardless of the frequency f. The coefficient C(y) is 0.85 at the minimum distance y=100 mm. Therefore, in this embodiment, the minimum value of the coefficient C(y) is 0.85. The distance L of two speaker elements 51 and 52 having two adjacent resonance frequencies f1 and f2 is set equal to or more than the value obtained by multiplying the intermediate wavelength λmid by the coefficient C(y)=0.85. As a result, even if the position of the object shifts from the specified position, the sound pressure without dip can be reproduced on the surface of the object. In other words, even if the position of the object shifts from the specified position, sound in a wide frequency band having a substantially uniform sound pressure can be reproduced on the surface of the object. The distance L is set so that the sound in a wide frequency band including the intermediate frequency fmid has a uniform sound pressure not including the dip of the sound pressure at the intermediate frequency fmid at a plurality of positions on the surface of the object.

The coefficient C(y) is 13.71 at the maximum distance y=2000 mm. In this embodiment, the maximum value of the coefficient C(y) is 13.71. The minimum value of the coefficient C(y) is the universal minimum value of the ultrasonic system 1. The maximum value of the coefficient C(y) depends on the distance y. The maximum value of the coefficient C(y) may be set according to the numerical value of the distance y. The maximum value of the coefficient C(y) is also limited by the maximum value of the distance L. The maximum value of the distance L may depend on the speaker 10. In the case that the speaker 10 has a relatively large scale corresponding to the total width of the target space TR, the maximum value of the distance L may reach the maximum width WM of the width direction WD of the target space TR. Therefore, the maximum value of the distance L is equal to or less than the maximum width WM in the width direction WD of the target space TR. The distance L is set equal to or less than the width of the target space. Here, a width indicates a length in a direction parallel to the central axis AXz. In the case that the speaker 10 is formed by a single semiconductor substrate 41, the maximum value of the distance L is equal to or less than the maximum value of the semiconductor chip or equal to or less than the maximum value of the semiconductor wafer.

According to the embodiment described above, the distance L is set so that the sound from the first speaker element 51 and the sound from the second speaker element 52 have a predetermined relationship PS at the target position TG. The target position TG is two or more positions on the object located in the target space. A predetermined relationship is a relationship in which a sound from the first speaker element and a sound from the second speaker element strengthen each other at an intermediate frequency fmid between the first resonance frequency f1 and the second resonance frequency f2. In other words, the distance L is set so that the strengthening relationship PS appear at two or more positions TG on the object located in the target space. The sound having the intermediate frequency fmid from the first speaker element 51 and the sound having the intermediate frequency fmid from the second speaker element 52 strengthen each other in the strengthening relationship PS. The intermediate frequency fmid is an intermediate frequency between the first resonance frequency f1 and the second resonance frequency f2. As a result, it is possible to provide a strengthening relationship of sounds at the intermediate frequency fmid at two or more positions on the object. As a result, it is possible to provide an ultrasonic generator which supplies a strong sound pressure in a wide band. Further, even if the position of the object is shifted, a strong sound pressure can still be supplied to the object.

The distance L is set equal to or more than a numerical value 2z obtained by multiplying a coefficient C(y)=0.85 by the intermediate wavelength λmid of the speaker elements 51 and 52 having the adjacent resonance frequencies f1 and f2. As a result, even if the human face shifts from the specified position by the same width as the face in the width direction WD, it is possible to provide a dip-free sound near the intermediate frequency fmid on the surface of the face. The distance L is appropriately set, the desired effect can be obtained by the small speaker 10.

The teachings of this disclosure are not limited to embodiments that target the human face. In this embodiment, the value of the distance x is set to 73 mm assuming a human face. Those skilled in the art who have meet this disclosure should understand that the value of the distance x can be set according to the object. For example, in the ultrasonic system 1 targeting the upper body of a human, the distance x can be set to a value exceeding 100 mm. Further, in the case that the central axis AXz is aligned with the direction of gravity and the whole human body in a standing posture is the object, the distance x may be set in the range of 1000 mm to 2000 mm. This disclosure should be construed to include these variations.

Second Embodiment

This embodiment is a modification based on the preceding embodiment. In the above embodiment, a speaker pair 60 composed of two speaker elements 51 and 52 having adjacent resonance frequencies is formed on one semiconductor substrate 41. Alternatively, in this embodiment, a plurality of speaker pairs 60 including two speaker elements having adjacent resonance frequencies are formed in a distributed manner on different semiconductor substrate 242 and 243 arranged apart from each other.

Figure 10:
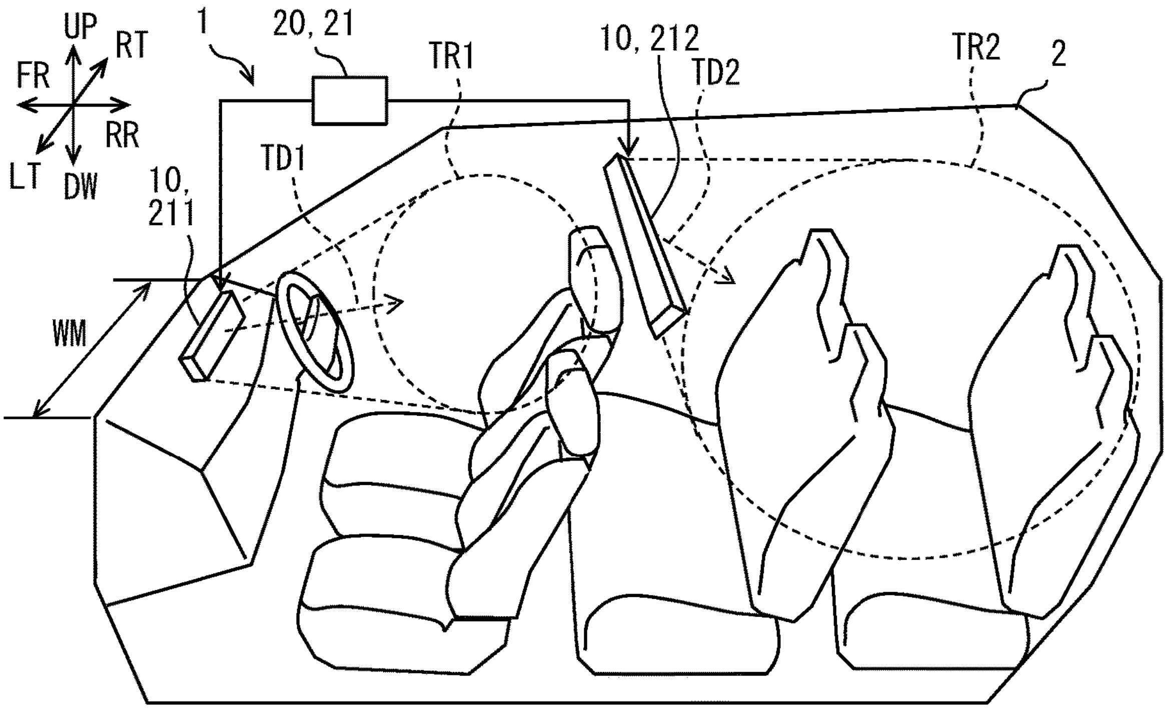
FIG. 10 is a block diagram of an ultrasonic system according to a second embodiment.

In FIG. 10, the ultrasonic system 1 includes a speaker 10. The speaker 10 includes a first speaker 211 and a second speaker 212. The first speaker 211 and the second speaker 212 can be replaced with the first speaker 11 and the second speaker 12 in the first embodiment. The first speaker 211 and the second speaker 212 have a larger dimension in the width direction WD than the first speaker 11 and the second speaker 12 in the first embodiment. The dimensions of the first speaker 211 and the second speaker 212 in the width direction WD are equal to or less than the maximum width WM.

Figure 11:
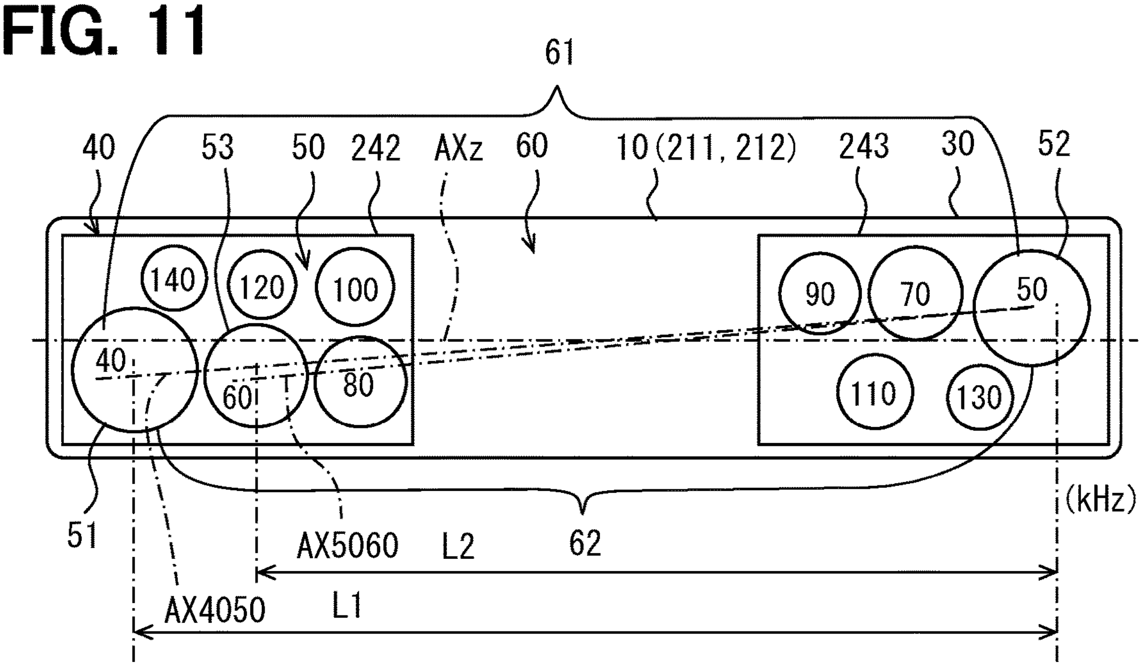
FIG. 11 is a front view of an ultrasonic generator.

In FIG. 11, the speaker 10 has a container 30. The speaker 10 includes a plurality of semiconductor elements 40 arranged in the container 30. The plurality of semiconductor elements 40 are provided by a plurality of semiconductor substrates 242 and 243. The speaker 10 includes a first semiconductor substrate 242 and a second semiconductor substrate 243 arranged apart from each other. The semiconductor substrate 242 and the semiconductor substrate 243 belong to one speaker 10 which is oriented towards one target area TR. The speaker 10 includes a plurality of speaker elements 50. The plurality of speaker elements 50 are distributed on the semiconductor substrates 242 and 243. The first speaker element is formed on the first semiconductor substrate 242, and the second speaker element is formed on the second semiconductor substrate 243.

In this embodiment, a plurality of speaker pairs 60 are arranged in a distributed manner on the semiconductor substrates 242 and 243. For example, the speaker element 51 having a resonance frequency f1=40 kHz and the speaker element 52 having a resonance frequency f2=50 kHz form one speaker pair 60. Further, the speaker element 52 having a resonance frequency f1=50 kHz and the speaker element 53 having a resonance frequency f2=60 kHz form another speaker pair 60. The speaker 10 emits sound having a wide frequency band from 40 kHz to 140 kHz. The speaker 10 includes a plurality of speaker elements 50 having different resonance frequencies every 10 kHz. The speaker 10 includes 10 speaker pairs 60.

The central axis between the plurality of speaker pairs 60 may be slightly tilted with respect to the central axis AXz. For example, the speaker pair 60 including the speaker element 51 and the speaker element 52 is separated by a distance L1 on the central axis AX4050. The speaker pair 60 including the speaker element 52 and the speaker element 53 is separated by a distance L2 on the central axis AX5060. Therefore, the plurality of speaker pairs 61 and 62 have different central axes AX4050 and AX5060 that intersect each other. However, since the semiconductor substrates 242 and 243 are small, the central axes AX of the plurality of speaker pairs 60 can be considered to be substantially parallel to each other. A plurality of central axes including the central axis AX4050 and the central axis AX5060 can be regarded as substantially parallel to the central axis AXz.

The first speaker element 51 and the second speaker element 52 are separated by a distance L1 along the central axis AXz. The first speaker element 51 and the second speaker element 52 form a first speaker pair 61. The first speaker pair 61 is characterized by a first intermediate frequency fmid1=45 kHz. The second speaker element 52 and the third speaker element 53 are separated by a distance L2 along the central axis AXz. The second speaker element 52 and the third speaker element 53 form a second speaker pair 62. The second speaker pair 62 is characterized by a second intermediate frequency fmid2=55 kHz. Similarly, 10 pairs of speaker pairs 60 are formed. All speaker pairs 60 are characterized by their respective intermediate frequency fmid. The distance L(L1, L2 . . . ) of all the speaker pairs 60 are equal to or more than the value 2z given by the above equation (9) or the above equation (11).

The distance L1 between the speaker element 51 and the speaker element 52 is equal to or more than the value 2z which may be set according to the intermediate frequency fmid=45 kHz. The distance L2 between the speaker element 52 and the speaker element 53 is equal to or more than the value 2z which may be set according to the intermediate frequency fmid=55 kHz. Similarly, the distance between the elements with respect to all the speaker elements 50 is equal to or more than the value 2z which may be set according to the intermediate frequency fmid. All distances L1, L2 . . . are set so that a sound of the intermediate frequency fmid observed in a strengthened manner without causing a dip on the surface of the object located in the target space TR.

The resonance frequency of the speaker element 51 and the resonance frequency of the speaker element 53 are in a close relationship, but they are not in an adjacent relationship. The sound at an intermediate frequency between the resonance frequency of the speaker element 51 and the resonance frequency of the speaker element 52 has a small sound pressure and is at a negligible level. In the description of this specification, the term pair or speaker pair refers to a pair of speaker elements having adjacent resonance frequencies in the speaker 10.

Third Embodiment

This embodiment is a modification based on the preceding embodiment. In the preceding embodiment, a speaker pair 60 including two speaker elements 51 and 52 having adjacent resonance frequencies is arranged in one container 30. Alternatively, in this embodiment, a plurality of speaker pairs 60 including two speaker elements having adjacent resonance frequencies are formed in a distributed manner in different containers 31 and 32 arranged apart from each other.

Figure 12:
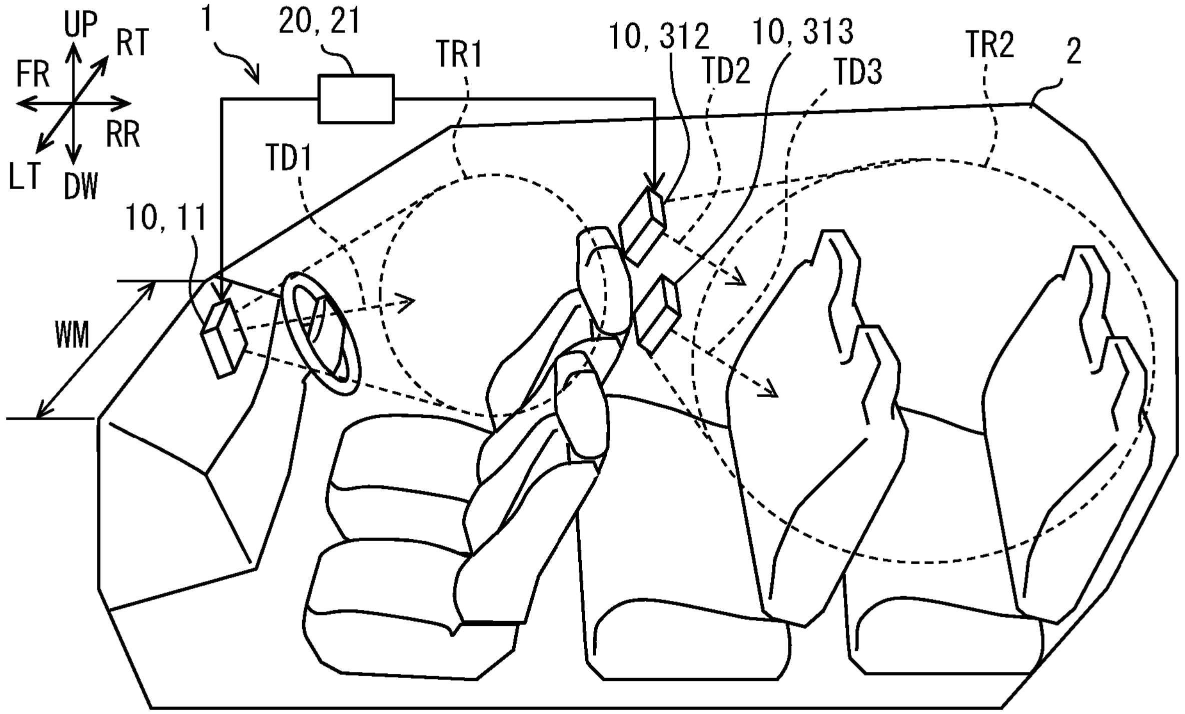
FIG. 12 is a block diagram of an ultrasonic system according to a third embodiment.

In FIG. 12, the ultrasonic system 1 includes a speaker 10. The speaker 10 includes a first speaker 11, a second speaker 312, and a third speaker 313. The description for the first speaker 11 may be in the preceding embodiment. The sound wave direction TD2 of the second speaker 312 points to the target space TR2 corresponding to the rear seat space. The sound wave direction TD3 of the third speaker 313 points to the target space TR2 corresponding to the rear seat space. The second speaker 312 and the third speaker 313 collectively provide one speaker. The second speaker 312 and the third speaker 313 provide a function corresponding to the second speaker 12 in the preceding embodiment.

Figure 13:
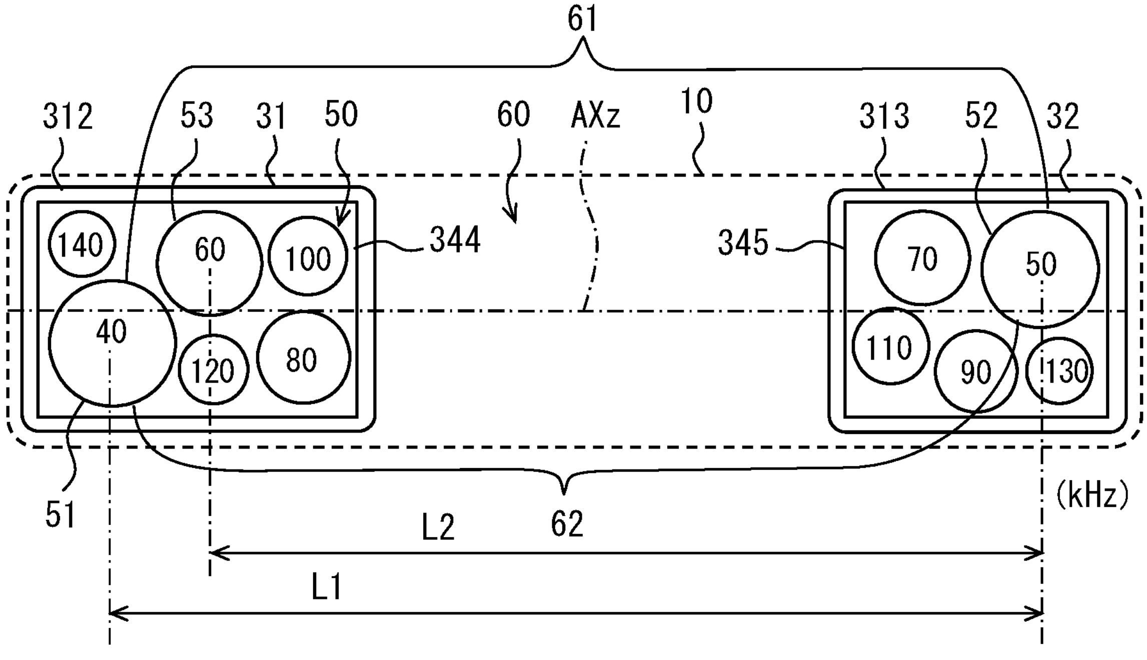
FIG. 13 is a front view of an ultrasonic generator.

FIG. 13 shows a plurality of speakers 312 and 313 that provide one speaker 10. In this embodiment, two of the first speaker 312 and the second speaker 313 provide one of the speaker 10. The second speaker 312 includes one container 31 and one semiconductor substrate 344 arranged in the container 31. The second speaker 312 has a group of a plurality of speaker elements. The third speaker 313 includes one container 32 and one semiconductor substrate 345 arranged in the container 32. The third speaker 312 has a group of a plurality of speaker elements. The plurality of semiconductor substrates 344 and 345 are arranged in the plurality of containers 31 and 32 in a distributed manner. Also in this embodiment, the speaker 10 includes a first semiconductor substrate 344 and a second semiconductor substrate 345 arranged apart from each other. The first speaker element is formed on the first semiconductor substrate 344, and the second speaker element is formed on the second semiconductor substrate 345.

One speaker element belonging to the second speaker 312 and one speaker element belonging to the third speaker 313 provide two speaker elements having adjacent resonance frequencies. The plurality of speaker elements belonging to the second speaker 312 and the plurality of speaker elements belonging to the third speaker 313 form a plurality of speaker pairs 60. In this embodiment, all speaker elements 50 form a plurality of speaker pairs 60.

The first speaker element 51 and the second speaker element 52 are separated by a distance L1 along the central axis AXz. The first speaker element 51 and the second speaker element 52 form a first speaker pair 61. The first speaker pair 61 is characterized by a first intermediate frequency fmid1=45 kHz. The second speaker element 52 and the third speaker element 53 are separated by a distance L2 along the central axis AXz. The second speaker element 52 and the third speaker element 53 form a second speaker pair 62. The second speaker pair 62 is characterized by a second intermediate frequency fmid2=55 kHz. Similarly, 10 pairs of speaker pairs 60 are formed. All speaker pairs 60 are characterized by their respective intermediate frequency fmid. The distance L(L1, L2 . . . ) of all the speaker pairs 60 are equal to or more than the value 2z given by the above equation (9) or the above equation (11). Also in this embodiment, the plurality of speaker pairs 61, and 62 have different central axes that intersect each other.

In the illustrated example, the speaker 10 includes a plurality of speaker elements 50. The plurality of speaker elements 50 are distributed on the semiconductor substrates 342 and 343. The 10 speaker elements form 10 pairs of speaker pairs 60. The distance L of each speaker pair 60 is set equal to or more than the minimum value 2z and is set equal to or less than the maximum value, as in the preceding embodiment. Therefore, even in this embodiment, uniform sound pressure without dip can be supplied over a wide frequency band on the surface of the object located in the target space TR.

As is clear from the disclosure of the first embodiment, the second embodiment, and the third embodiment, the plurality of speaker elements 50 are arranged so as to form a plurality of speaker pairs 60. The plurality of speaker elements 50 may be arranged in a distributed manner in one container 30 which forms one speaker 10. Alternatively, the plurality of speaker elements 50 may be distributed in a plurality of containers 30 which form one speaker 10. Alternatively, the plurality of speaker elements 50 may be arranged in a distributed manner in one semiconductor element 40 which forms one speaker 10. Alternatively, the plurality of speaker elements 50 may be distributed in a plurality of semiconductor elements 40 which form one speaker 10. In the following description, the arrangement of the plurality of speaker elements 50 is described without being restricted by the container 30 and the semiconductor element 40.

Fourth Embodiment

This embodiment is a modification based on the preceding embodiment. In the preceding embodiment, directions of the distance L of the plurality of speaker elements 50 included in one speaker 10 are substantially parallel to each other. On the other hand, in this embodiment, one speaker 10 includes a plurality of speaker elements 50 in which the directions of the distance L apparently intersect with each other.

Figure 14:
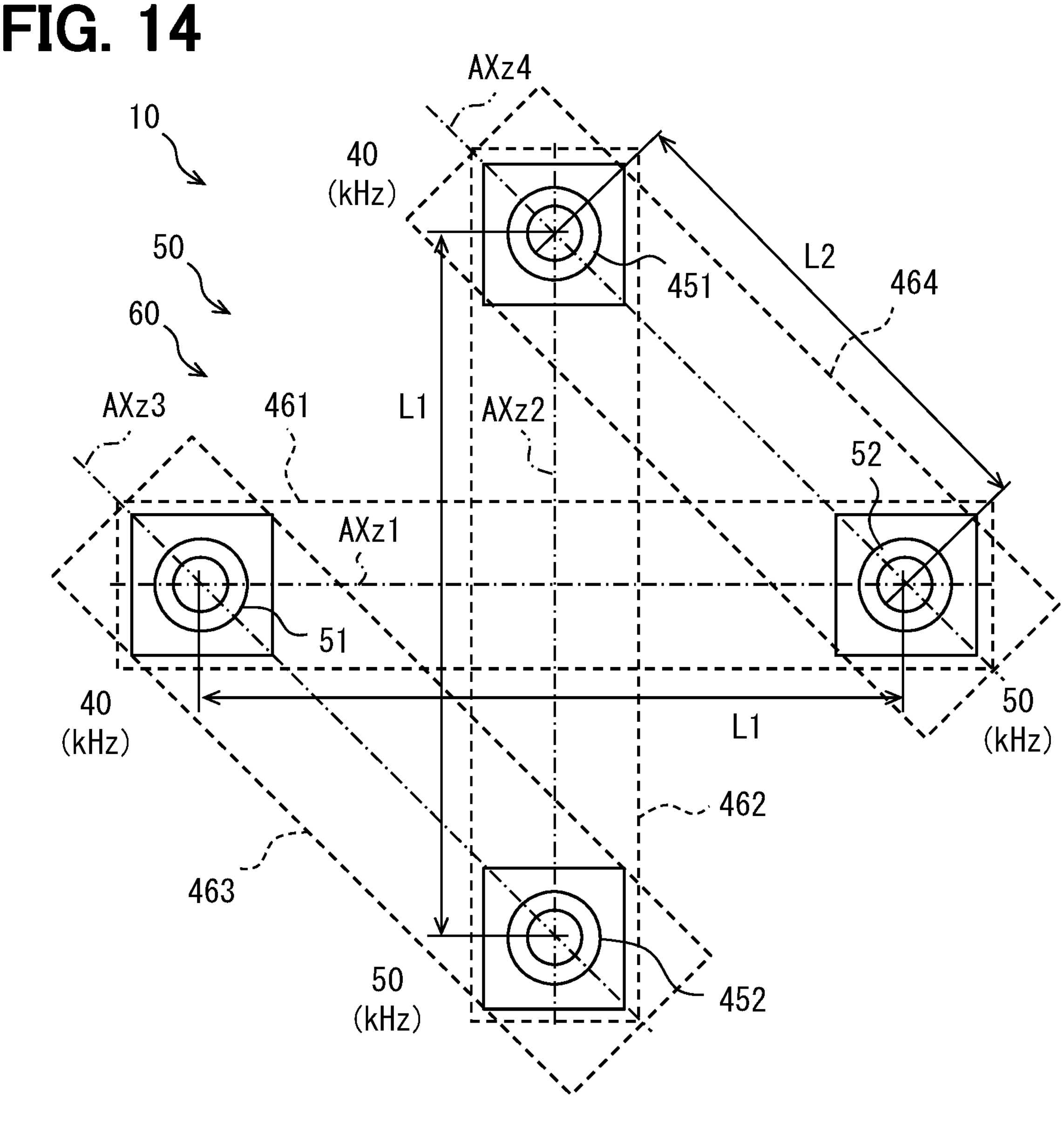
FIG. 14 is a front view of an ultrasonic generator according to a fourth embodiment.

In FIG. 14, the speaker 10 includes a plurality of speaker elements 50. In the drawing, typical speaker elements 50 are illustrated. The speaker 10 includes four speaker elements 51, 52, 451 and 452. The plurality of speaker elements 50 are arranged at intersections of a matrix. The plurality of speaker elements 50 are arranged in a matrix.

The speaker 10 includes a first speaker element 51 and a second speaker element 52. The first speaker element 51 has a resonance frequency f1. The second speaker element 52 has a resonance frequency f2. The first speaker element 51 and the second speaker element 52 form one first speaker pair 461. The first speaker element 51 and the second speaker element 52 belonging to the first speaker pair 461 are separated by a distance L1 on the central axis AXz1. The central axis AXz1 extends along the horizontal direction. The distance L1 is equal to or more than the value 2z.

The speaker 10 includes a third speaker element 451 and a fourth speaker element 452. The third speaker element 451 has a resonance frequency f1. The fourth speaker element 452 has a resonance frequency f2. The third speaker element 451 and the fourth speaker element 452 form the other one of second speaker pair 462. The third speaker element 451 and the fourth speaker element 52 belonging to the second speaker pair 462 are separated by a distance L1 on a central axis AXz2. The central axis AXz2 extends along the direction of gravity (vertical direction). The distance L1 is equal to or more than the value 2z.

The central axis AXz1 and the central axis AXz2 intersect each other at a common point. The central axis AXz1 and the central axis AXz2 are orthogonal to each other in a common point.

The speaker 10 forms a third speaker pair 463 by the first speaker element 51 and the fourth speaker element 452. The first speaker element 51 and the fourth speaker element 452 belonging to the third speaker pair 463 are separated by a distance L2 on a central axis AXz3. The central axis AXz3 extends along an oblique direction inclined with respect to the direction of gravity. The distance L2 is equal to or more than the value 2z.

The speaker 10 forms a fourth speaker pair 463 by the third speaker element 451 and the second speaker element 52. The third speaker element 451 and the second speaker element 52 belonging to the fourth speaker pair 464 are separated by a distance L2 on a central axis AXz4. The central axis AXz4 extends along an oblique direction inclined with respect to the direction of gravity. The central axis AXz3 and the central axis AXz4 are parallel to each other. The distance L2 is equal to or more than the value 2z.

The first speaker pair 461 and the second speaker pair 462 are referred to as a primary speaker pair. The third speaker pair 463 and the fourth speaker pair 464 are referred to as a secondary speaker pair collaterally formed by the first speaker pair 461 and the second speaker pair 462. It should be understood that these primary and secondary names are subjective and interchangeable. Also in this embodiment, the plurality of speaker pairs 461, 462, 463, and 464 have different central axes AXz1, AXz2, AXz3, and AXz4 that intersect each other.

In this embodiment, the first speaker pair 461 and the second speaker pair 462 have the same frequency that characterizes them. The frequencies that characterize the first speaker pair 461 and the second speaker pair 462 are a resonant frequency f1, a resonant frequency f2, and an intermediate frequency fmid. In other words, the first speaker pair 461 and the second speaker pair 462 are completely overlapping with respect to the frequencies that characterize them. The first speaker pair 461 and the second speaker pair 462 overlap at least partially with respect to the frequencies that characterize them.

The first speaker pair 461 and the second speaker pair 462 are in a relationship in which the central axis AXz1 and the central axis AXz2 intersect. The central axis AXz1 and the central axis AXz2 may be spatially intersecting in direction. The central axis AXz1 and the central axis AXz2 do not have to intersect at a common point as shown in the illustrated example. For example, the first speaker pair 461 and the second speaker pair 462 may be separated from each other.

Figure 15:
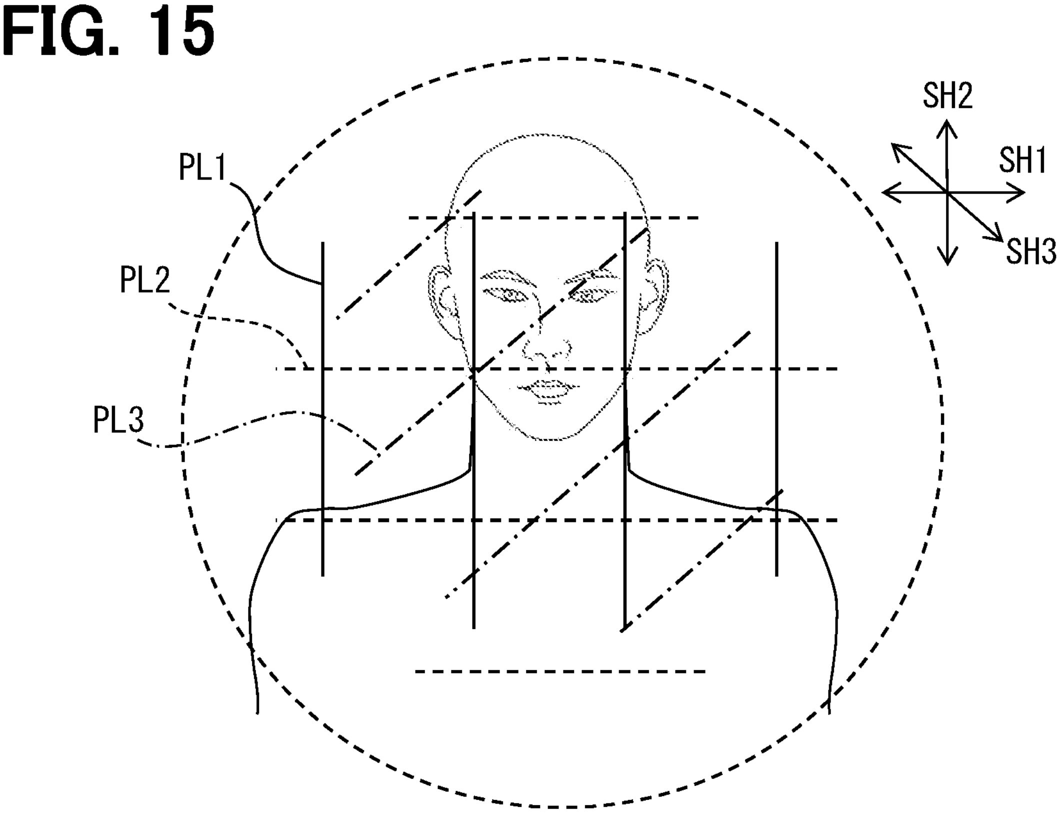
FIG. 15 is a front view showing an example of a target space.

FIG. 15 shows a plurality of relationship lines PL1, PL2 and PL3 provided by the plurality of speaker pairs 461, 462, 463, and 464. The relationship lines PL1, PL2, and PL3 indicate the positions where the strengthening relationship of the sounds having the intermediate wavelength λmid is obtained. The first speaker pair 461 provides a relationship line PL1. The second speaker pair 462 provides a relationship line PL2. The third speaker pair 461 provides a relationship line PL3. The fourth speaker pair 464 provides a relationship line PL3. The relationship lines PL1, PL2, and PL3 are part of curves.

A crossing angle between the relationship line PL1 and the relationship line PL2 is equal to a crossing angle between the central axis AXz1 of the first speaker pair 461 and the central axis AXz2 of the second speaker pair 462. In this embodiment, the crossing angle is 90 degrees.

Further, the relationship lines PL3 intersect with the relationship lines PL1 and PL2. A crossing angle between the relationship lines PL1 and PL2 and the relationship line PL3 is equal to a crossing angle between the central axes AXz1 and AXz2 and the central axes AXz3 and AXz4. In this embodiment, the crossing angles are +45 degrees and −45 degrees.

According to this embodiment, it is possible to obtain a uniform sound pressure in the vicinity of the intermediate frequency fmid at a plurality of positions laterally separated in the target space. In addition, it is possible to obtain a uniform sound pressure in the vicinity of the intermediate frequency fmid at a plurality of positions separated in the vertical direction in the target space. By crossing the central axes of a plurality of speaker pairs 461 and 462, collateral speaker pairs 462 and 463 are created. As a result, it is possible to further obtain a uniform sound pressure in the vicinity of the intermediate frequency fmid at a plurality of positions diagonally separated in the target space. In this embodiment, high sound pressure can be provided in many positions. Moreover, even if the object is shifted in the horizontal direction SH1 and the vertical direction SH2, high sound pressure can be provided. Further, by providing the relationship line PL3, it is possible to provide a high sound pressure even if the object is shifted in the oblique direction SH3.

Fifth Embodiment

This embodiment is a modification based on the preceding embodiment. In the preceding embodiment, the crossing angle of the central axes of the plurality of speaker pairs included in one speaker 10 is 90 degrees. Alternatively, the crossing angle of the plurality of central axes may be set to angles other than 90 degrees.

Figure 16:
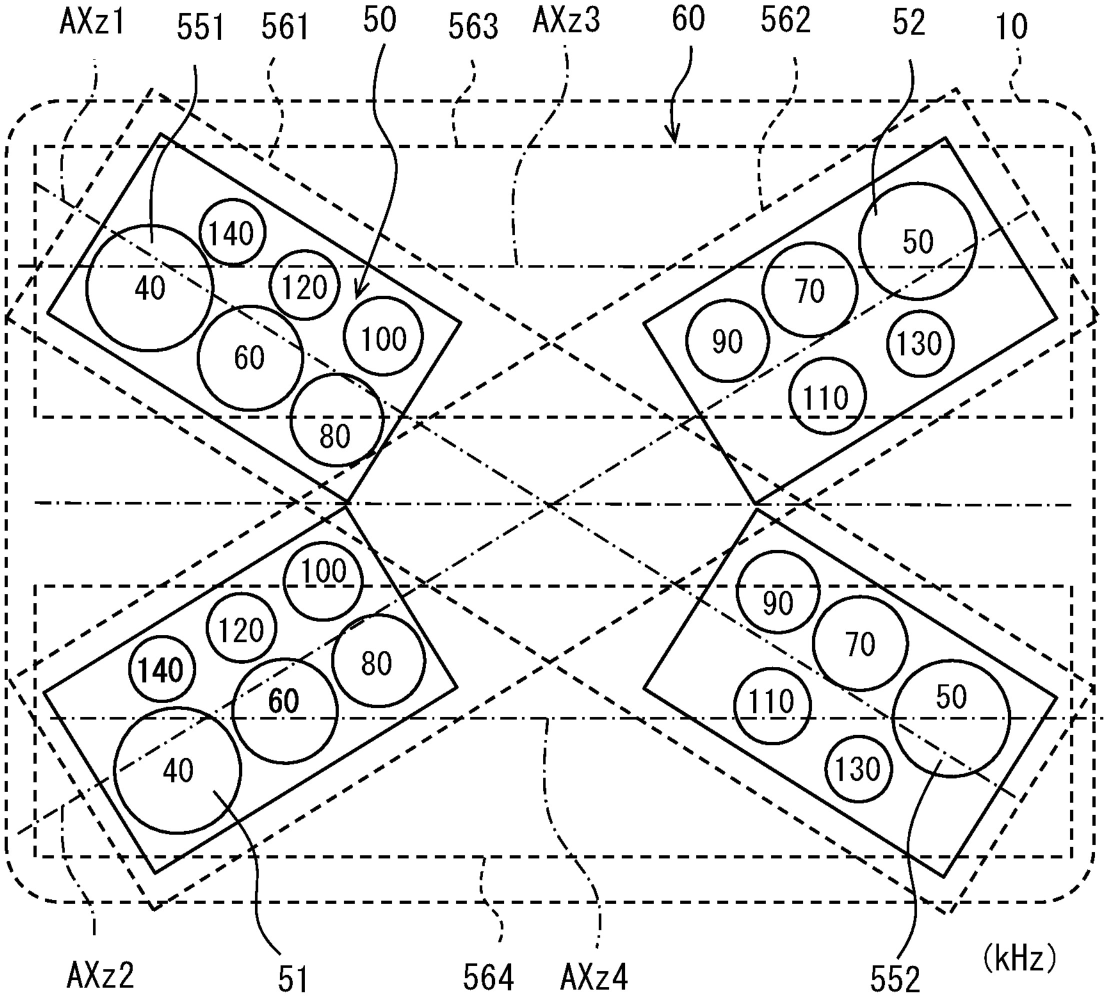
FIG. 16 is a front view of an ultrasonic generator according to a fifth embodiment.

In FIG. 16, the speaker 10 includes a plurality of speaker elements 50. The plurality of speaker elements 50 form a plurality of speaker pairs 60. For example, the speaker element 51 and the speaker element 52 form one speaker pair. Both the speaker element 551 and the speaker element 552 form one speaker pair. The speaker element 52 and the speaker element 551 form a collateral speaker pair. Further, the speaker element 51 and the speaker element 552 form a collateral speaker pair.

These plurality of speaker pairs form a plurality of groups. These plurality of groups can be distinguished in relation to an angle of the central axis AXz. In this embodiment, two primary groups 561 and 562 are formed. Further, in this embodiment, two secondary groups 563 and 564 are formed. One group has an element corresponding to one speaker 10. A first group 561 including a plurality of speaker pairs has a central axis AXz1. A second group 562 including a plurality of speaker pairs has a central axis AXz2. A third group 563 including a plurality of speaker pairs has a central axis AXz3. A fourth group 564 including a plurality of speaker pairs has a central axis AXz4.

The first group 561 and the second group 562 are arranged in a line-symmetrical manner with respect to the horizontal central axis. The arrangement of the first group 561 and the arrangement of the second group 562 are similar. The central axis AXz1 of the first group 561 and the central axis AXz2 of the second group 562 intersect at an angle different from 90 degrees. The central axis AXz1 extends obliquely with respect to the direction of gravity. The central axis AXz2 extends obliquely with respect to the direction of gravity. These oblique angles are different from 90 degrees. The central axis AXz1 and the central axis AZx2 are inclined in an opposite direction to the direction of gravity. The central axis AXZ3 of the third group 563 also intersects the central axes AXz1 and AXz2 at an angle different from 90 degrees. The central axis AXZ4 of the fourth group 564 also intersects the central axes AXz1 and AXz2 at an angle different from 90 degrees. The central axis AXZ3 and the central axis AXz4 are parallel to each other. The central axes AXz3 and AXz4 extend along the horizontal direction. Also in this embodiment, the plurality of speaker pairs 561, 562, 563, 564 have different central axes AXz1, AXz2, AXz3, and AXz4 that intersect each other.

Also in this embodiment, the distance between the elements satisfies the conditions described in the preceding embodiment. Also in this embodiment, the same effect as that of the preceding embodiment can be obtained. Further, in this embodiment, a high sound pressure with an intermediate frequency fmid can be obtained at a large number of positions of the target space TR in the direction corresponding to the central axes AXz1 and AXz2.

Sixth Embodiment

This embodiment is a modification based on the preceding embodiment. In the preceding embodiment, the plurality of speaker elements 50 included in one speaker 10 are irregularly arranged. Alternatively, in this embodiment, the second speaker pair is arranged inside the first speaker pair. In other words, the first speaker pair is arranged outside the second speaker pair. The first speaker pair is characterized by a first intermediate frequency fmid1. The second speaker pair is characterized by a second intermediate frequency fmid2. The second intermediate frequency fmid2 is higher than the first intermediate frequency fmid1 (fmid1<fmid2). The relationship between a plurality of speaker pairs in this embodiment is also referred to as an internal/external positional relationship in the following description.

Figure 17:
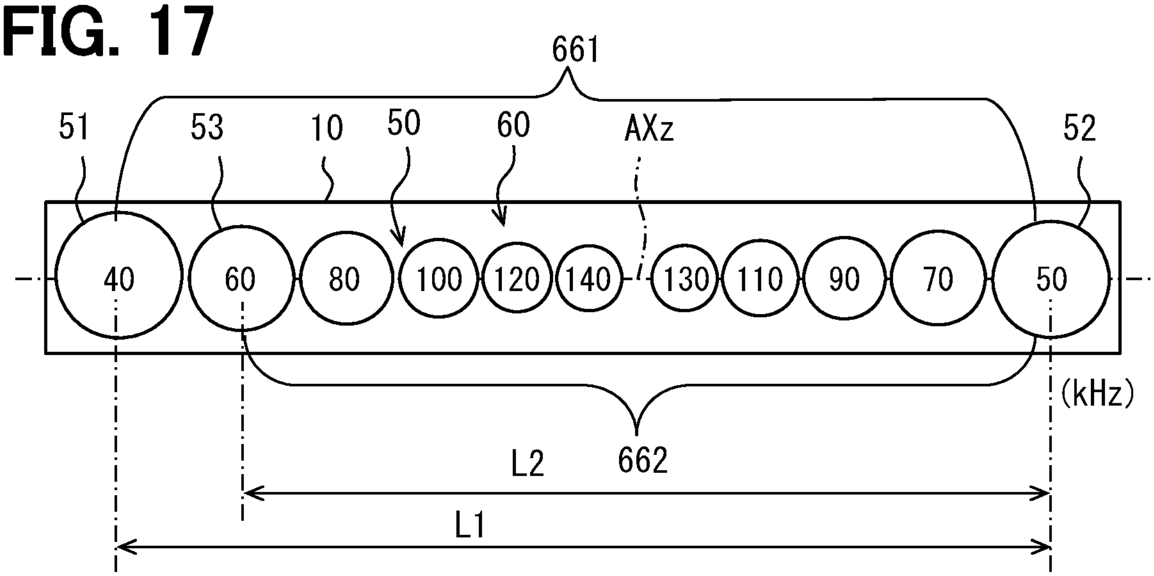
FIG. 17 is a front view of an ultrasonic generator according to a sixth embodiment.

In FIG. 17, the speaker 10 covers a predetermined wide frequency band (about 40 kHz to about 140 kHz). The speaker 10 includes a plurality of speaker elements 50. The plurality of speaker elements 50 have different resonance frequencies from each other. The resonance frequencies of the plurality of speaker elements 50 are different for each predetermined frequency difference. The plurality of speaker elements 50 form a plurality of speaker pairs 60. In this embodiment, the speaker 10 includes 10 speaker elements 50. The 10 speaker elements form 10 pairs of speaker pairs 60. Each of the plurality of speaker elements 50 has a resonance frequency of 40, 50, 60, 70, 80, 90, 100, 110, 120, 130, 140 kHz. The frequency difference is 10 kHz. The frequency difference and the number of the plurality of speaker elements 50 are not limited to the illustrated embodiment. For example, the frequency difference may be various frequency differences such as 5 kHz and 20 kHz. For example, the speaker 10 may include several speaker elements 50 to a dozen or more speaker elements 50. The plurality of speaker elements 50 may be centrally formed on a single semiconductor substrate or may be dispersedly formed on a plurality of semiconductor substrates.

The first speaker element 51 and the second speaker element 52 are separated by a distance L1 along the central axis AXz. The first speaker element 51 and the second speaker element 52 form a first speaker pair 661. The first speaker pair is characterized by a first intermediate frequency fmid1=45 kHz.

The second speaker element 52 and the third speaker element 53 are separated by a distance L2 along the central axis AXz. The second speaker element 52 and the third speaker element 53 form a second speaker pair 662. The second speaker pair 662 is characterized by a second intermediate frequency fmid2=55 kHz.

The first intermediate frequency fmid1 is lower than the second intermediate frequency fmid2. The distance L1 and the distance L2 are equal to or more than a theoretically set value 2z. The distance L1 is larger than the distance L2. The second speaker pair 662 is arranged inside the first speaker pair 661.

In this embodiment, the internal/external positional relationship is satisfied in all speaker pairs in the speaker 10. Alternatively, a part of the speaker pairs, two speaker pairs may satisfy the above-mentioned internal/external positional relationship among the plurality of the speaker pairs in the speaker 10. In one example, the first intermediate frequency of the first speaker pair arranged outside and the second intermediate frequency of the second speaker pair arranged inside the first speaker pair may be separated by more than the above frequency difference. In another example, at least two speaker pairs belonging a low frequency side may satisfy the above-mentioned internal/external positional relationship, and a plurality of speaker pairs on the high frequency side may be arranged irregularly. On the contrary, at least two speaker pairs belonging the high frequency side may satisfy the above-mentioned internal/external positional relationship, and a plurality of speaker pairs on the low frequency side may be irregularly arranged.

The internal/external positional relationship of this embodiment may be combined with the features of the preceding embodiment. For example, the plurality of speaker elements 50 shown in FIG. 16 may be arranged so as to satisfy the internal/external positional relationship shown in FIG. 17.

Other Embodiments

The disclosure in this specification, the drawings, and the like is not limited to the exemplified embodiments. The disclosure includes the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Hence, various technical ideas can be extracted from the disclosure of the specification, the drawings, and the like without being bound by the description of the claims.

What is claimed is:

1. An ultrasonic generator which radiates sound waves toward a target space, comprising:

a plurality of speaker elements which are piezoelectric micro electro mechanical systems ultrasonic transducers, wherein the plurality of speaker elements includes:

a first speaker element having a first resonance frequency; and a second speaker element having a second resonance frequency adjacent to the first resonance frequency, wherein the first speaker element and the second speaker element are arranged apart from each other in a direction intersecting with a direction toward the target space, and wherein a distance between the first speaker element and the second speaker element is set so that a strengthening relationship of sounds having an intermediate frequency from the first speaker element and from the second speaker element appear at two or more positions on an object located in the target space, and wherein the strengthening relationship is created by strengthening a sound having the intermediate frequency between the first resonance frequency and the second resonance frequency from the first speaker element and a sound having the intermediate frequency from the second speaker element, and wherein the distance is set equal to or more than a value 2z obtained from an equation $n=(\mathrm{SQRT}((z+x)^2+y^2)-\mathrm{SQRT}((z-x)^2+y^2))/\lambda mid+½)$ where n is the natural number equal to or more than 1, z is a distance between a midpoint between two speaker element and one of the speaker elements, x is a width of the object, y is a distance between the midpoint and the object, and λmid is a wavelength of the intermediate frequency.

2. The ultrasonic generator claimed in claim 1, further comprising:

a semiconductor substrates made of continuous material, wherein both the first speaker element and the second speaker element are formed on the semiconductor substrate.

3. The ultrasonic generator claimed in claim 1, further comprising:

a first semiconductor substrate and a second semiconductor substrate arranged apart from each other, wherein the first speaker element is formed on the first semiconductor substrate, and the second speaker element is formed on the second semiconductor substrate.

4. The ultrasonic generator claimed in claim 1, wherein the plurality of speaker elements forms a plurality of speaker pairs.

5. The ultrasonic generator claimed in claim 4, wherein the plurality of speaker pairs have different central axes that intersect each other.

6. The ultrasonic generator claimed in claim 4, wherein the plurality of the speaker pairs includes:

a first speaker pair characterized by a first intermediate frequency; and second speaker pair characterized by a second intermediate frequency higher than the first intermediate frequency, wherein the second speaker pair is arranged inside the first speaker pair.

7. The ultrasonic generator claimed in claim 1, wherein the first speaker element and the second speaker element are arranged sufficiently apart from each other with respect to a wavelength of the intermediate frequency.

8. The ultrasonic generator claimed in claim 1, wherein the distance is set equal to or more than a value 2z obtained from an equation $2z=0.85\times\lambda mid$, where the object is a human face, n is the natural number of 1 or more, and z is a distance between a midpoint between two speaker elements and one of the speaker elements.

9. The ultrasonic generator claimed in claim 8, wherein the distance is set to be equal to or less than a width of the target space.

* * * * *